United States Patent [19]

Krenzer

[11] Patent Number: 5,289,815
[45] Date of Patent: Mar. 1, 1994

[54] METHOD OF DRESSING A THREADED GRINDING WHEEL

[75] Inventor: Theodore J. Krenzer, West Rush, N.Y.

[73] Assignee: The Gleason Works, Rochester, N.Y.

[21] Appl. No.: 80,607

[22] Filed: Jun. 21, 1993

[51] Int. Cl.⁵ .................................. B24B 53/075
[52] U.S. Cl. ............................... 125/11.03; 51/287
[58] Field of Search .................... 125/11.01, 11.03; 51/287, 26, 325

[56] References Cited

U.S. PATENT DOCUMENTS

| | | | |
|---|---|---|---|
| 2,304,586 | 12/1942 | Miller | 407/23 |
| 2,309,530 | 1/1943 | Perkins | 29/90.6 |
| 2,824,556 | 2/1958 | Bateman | 125/11.03 |
| 3,602,209 | 8/1971 | Bocker | 125/11.03 |
| 4,954,028 | 9/1990 | Seroo et al. | 409/26 |
| 5,175,962 | 1/1993 | Pedersen | 51/165.71 |

FOREIGN PATENT DOCUMENTS

| | | | |
|---|---|---|---|
| 0232167 | 9/1990 | Japan | 125/11.01 |
| 9209395 | 6/1992 | World Int. Prop. O. | |
| 9211967 | 7/1992 | World Int. Prop. O. | |
| 9218279 | 10/1992 | World Int. Prop. O. | |

Primary Examiner—Robert A. Rose
Attorney, Agent, or Firm—Robert L. McDowell; Ralph E. Harper

[57] ABSTRACT

A method of dressing a threaded grinding wheel for grinding crown gears. The method comprises providing a dressing tool in the form of a pinion member with the dressing tool having the same pitch as a mating pinion member of the crown gear. Rotating the dressing tool and the grinding wheel at respective velocities whereby the dressing tool and grinding wheel may run in mesh with one another. Moving the dressing tool across the width of the grinding wheel simultaneously with the dressing tool and grinding wheel rotating in mesh, with the dressing tool moving completely along the width of the grinding wheel. The path that the dressing tool moves along being defined as an arcuate path about a point on the grinding wheel corresponding to a center point of the mating pinion.

20 Claims, 5 Drawing Sheets

METHOD OF DRESSING A THREADED GRINDING WHEEL

FIELD OF THE INVENTION

The present invention is directed to a method of dressing a threaded grinding wheel. More particularly, the present invention relates to a dressing method employing a gear-shaped dressing tool for dressing threaded grinding wheels utilized in the grinding of face gears.

BACKGROUND OF THE INVENTION

Crown gears, also known as face gears, are gears that are used in angle drives. Crown gears generally have teeth that are radially extending in their longitudinal direction with an increasing pressure angle from the inside end to the outside end of each tooth.

Crown gears mesh with a cylindrical pinion having straight or helical toothing. Usually, the axes of the crown gear and pinion intersect at an angle of ninety degrees with one another but this is not always the case. The angle of intersection may be other than ninety degrees, or, the axes may cross but not intersect one another. Gear sets comprising a crown gear and its mating pinion have advantages such as the absence of any need for axial adjustment of the pinion, a high gear ratio, and a high transverse contact ratio being achievable without special provisions.

A method of manufacturing crown gears is taught by U.S. Pat. No. 2,304,586 to Miller. A hobbing method is disclosed wherein the form of the hob is based on the tooth form of a pinion which meshes with the desired crown gear. The shape of the cutting edge of the hobbing tool, as seen in an axial section, is always the shape of the outer contour of a cross-section of a segment of the pinion. As the hob rotates, its helically arranged teeth emulate the movement of the teeth of the pinion turning in mesh with the crown gear.

Several methods exist for finishing crown gears. One such method is disclosed in U.S. Pat. No. 4,954,028 to Seroo et al. and comprises a grinding disc having an outer grinding periphery corresponding to the tooth profile of a mating pinion to the crown gear.

U.S. Pat. No. 2,309,530 to Perkins teaches positioning a crown gear into meshing engagement with two pinions, one pinion driving the crown gear which in turn drives the second pinion. While the gears are rotating, the crown gear is caused to traverse the pinions. The teeth of the crown gear are shaped by the form of the pinion teeth and are finished by abrasive or cutting action or by metal displacement depending on the material of the crown gear and pinions.

In a similar manner, published PCT International application No. WO 92/18279 teaches a method for finishing hardened crown gears by meshing the crown gear with a honing pinion while moving the gear and pinion relative to one another back and forth along the axis of the honing tool.

Published PCT International application No. WO 92/09395 discloses a grinding wheel for finishing crown gears which is formed based on the previously mentioned U.S. Pat. No. 2,304,586 in that the helically arranged cutting elements are essentially replaced with a grinding thread or rib helically arranged about the periphery of the tool. This type of tool is known as a hobbing grinding disc or threaded grinding wheel.

The threaded grinding wheel of WO 92/09395 is formed with the ribs being free of undercuts such that the grinding wheel may be dressed without the cross-section of the ribs being changed as a result of the dressing. Dressing of the grinding wheel surfaces takes place in dressing tool increments of 1-5 degrees between a minimum angle and a maximum angle based on the minimum and maximum pressure angles for a crown gear to be produced. This incremental dressing process, however, results in rib profile surfaces that are not smooth but instead consist of a series of flat portions due to the incremental positions of the dressing tool.

In published PCT International Application No. WO 92/11967, a hobbing grinding disc is utilized for grinding crown gears. The grinding wheel is dressed by a dressing tool having the same shape as the crown gear to be ground. While the dressing tool and grinding wheel are rotating in mesh, additional relative motion is included along the length and height of the teeth of the dressing tool to ensure that all surfaces of the grinding wheel are contacted by the dressing tool. Dressing tools of this type are complex in that accurate diamond deposition on the tooth surface geometry of the crown gear shaped dressing tool is difficult to control.

It is an object of the present invention to provide a dressing process for a threaded grinding wheel for the grinding of crown gears wherein a smooth, accurate grinding profile surface is formed with a simple dressing tool.

SUMMARY OF THE INVENTION

The present invention is directed to a method of dressing a threaded grinding wheel for grinding crown gears wherein the threaded grinding wheel has an axis of rotation, a width, and includes at least one thread-like grinding surface or rib generally helically arranged in at least one revolution about the grinding wheel. The thread-like grinding surface extends along the width of the grinding wheel with the thread-like grinding surface, when viewed in an axial section of the grinding wheel, having the tooth form of a mating pinion member to the crown gear.

The method comprises providing a dressing tool in the form of a pinion member with the dressing tool having the same pitch as the mating pinion member. The dressing tool is moved relatively across the width of the grinding wheel simultaneously with the dressing tool and grinding wheel rotating in mesh, with the dressing tool moving completely along the width of the grinding wheel. The path that the dressing tool moves along is defined by an arcuate path about a point on the grinding wheel that corresponds to a center point of the mating pinion.

DESCRIPTION OF THE PREFERRED EMBODIMENTS

The preferred embodiments of the present invention will now be discussed with reference to the accompanying drawings.

Figure 1:
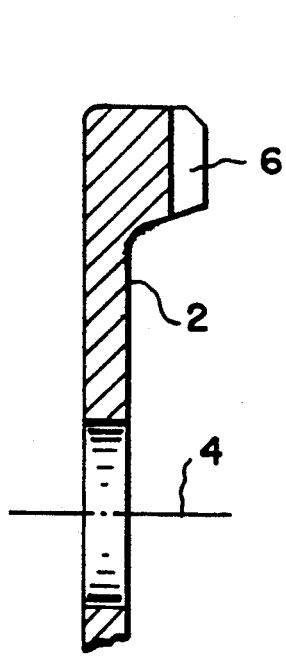
FIGS. 1 and 2 illustrate, respectively, partial side and front views of a crown gear.
Figure 2:
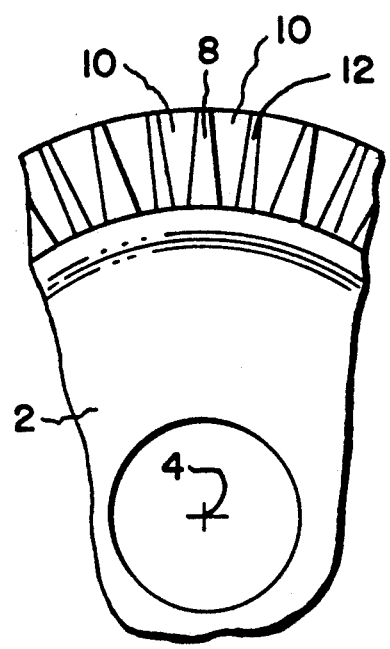

FIGS. 1 and 2 illustrate a crown gear 2 having an axis of rotation 4 and radially extending teeth 6. The teeth 6 have a top surface 8, flank surfaces 10 and root portion 12. Although radially extending teeth are shown, the teeth of the crown gear 2 may also be helically (nonradial) arranged.

Figure 3:
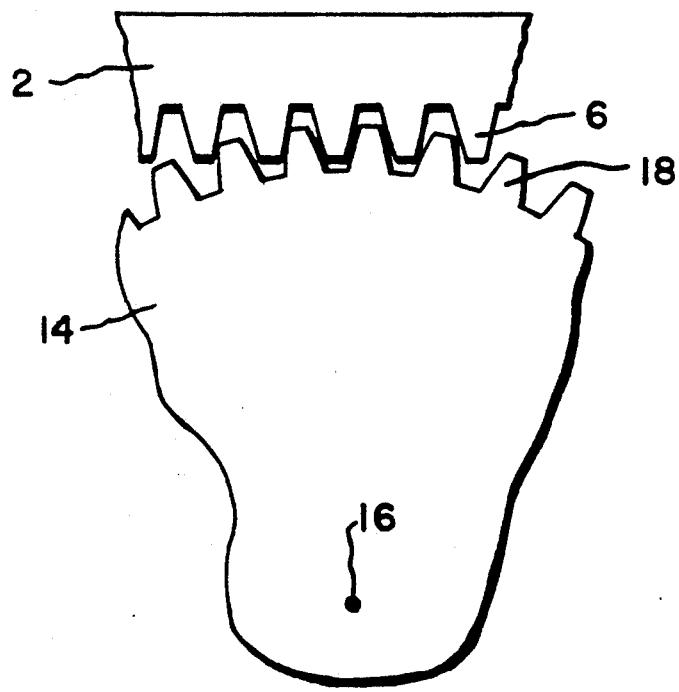
FIG. 3 shows a partial view of a crown gear in mesh with a pinion.

FIG. 3 shows crown gear 2 in mesh with a mating cylindrical pinion 14. The mating pinion 14 has an axis of rotation 16 and teeth 18. The teeth of the mating pinion 14 have the same pitch as the teeth 6 of the crown gear 2, that is, the spacing from one point on a tooth to a similar point on an adjacent tooth is equal for both pinion 14 and crown gear 2.

Figure 4:
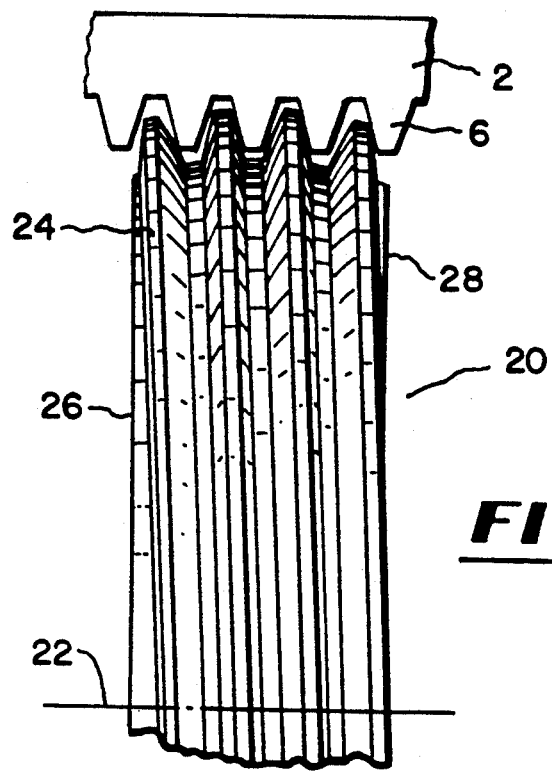
FIG. 4 illustrates a threaded grinding wheel in engagement with a crown gear.

Crown gears may be ground with a threaded grinding wheel as discussed in previously mentioned WO 92/09395 and illustrated by FIG. 4. Crown gear 2 is in engagement with grinding wheel 20 rotatable about axis 22 and having a threaded grinding surface or rib 24 helically arranged about the periphery of the grinding wheel and extending along the width of the grinding wheel between ends 26 and 28. Grinding in this manner is based on earlier discussed U.S. Pat. No. 2,304,586 which discloses a hobbing cutter for forming crown gears.

Figure 5:
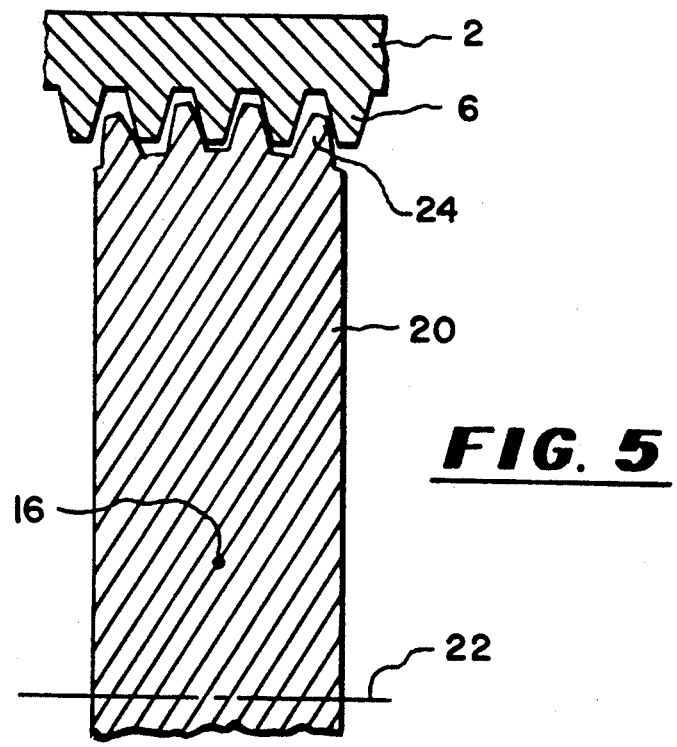
FIG. 5 depicts an axial cross-section of the threaded grinding wheel of FIG. 4.

Crown gears are capable of being ground by a threaded grinding wheel because the outer contour of the grinding wheel, when viewed in an axial section, emulates the tooth surfaces of a mating pinion to the crown gear. FIG. 5 shows an axial section of the grinding wheel 20 of FIG. 4. It can be seen that the outer contour of the axial section emulates the tooth surfaces 18 of the mating pinion 14 of FIG. 3. Location 16 of FIG. 5 is the point on the grinding wheel that corresponds to the center of the mating pinion 14 and is located a constant distance from axis 22.

Due to the helical arrangement of the grinding surface 24 of the grinding wheel 20, as the grinding wheel rotates, successive axial sections of the grinding wheel engage the crown gear 2 such that the outer contour of the grinding surface 24 meshes with the crown gear 2 in a manner essentially the same as the tooth surfaces 18 of the mating pinion 14 meshing with the crown gear 2. In other words, the grinding surface 24 of the grinding wheel 20 is arranged and shaped to represent conjugate teeth of the mating pinion 14. When viewed in an axial section such as FIG. 5, rotation of the grinding wheel 2, due to the lead of the threaded grinding surface 24, causes the outer contour to advance in mesh with crown gear 2 as though the outer contour were the teeth of the mating pinion 14 rotating about point 16. A more detailed explanation of grinding crown gears with a threaded grinding wheel is not believed necessary for a complete understanding of the present invention, however, such an explanation can be found in the above-referenced U.S. Pat. No. 2,304,586 and WO 92/09395.

When the grinding surface 24 of grinding wheel 2 becomes worn, it is necessary to restore the shape of the surface 24 by dressing such as with a diamond plated tool. The present invention resides in the method of dressing the threaded grinding wheel.

The present inventive process employs a gear-type dressing tool with the same pitch and essentially the same tooth profile shape as the mating pinion 14 but not necessarily the same number of teeth. Having the same pitch, the dressing tool 30 is therefore conjugate to the mating pinion 14 and, hence, the grinding wheel 20. Although the same number of teeth would preferably be present on the dressing tool 30 as on the mating pinion 14, a fewer number of teeth or a greater number of teeth may be present but the pitch must remain the same regardless of the number of teeth in order that the dressing tool and grinding wheel remain conjugate. The dressing tool includes a working surface of an appropriate dressing material such as diamond.

Since the dressing tool is conjugate to the grinding wheel which in turn represents the tooth surfaces of a mating pinion to the crown gear, the tooth surfaces of the dressing tool together with the orbital path of movement 38, may be thought of as representing the tooth surfaces of a rotating crown gear in mesh with its mating pinion. Therefore, the dressing tool rotation and movement dresses the conjugate tooth form to the crown gear teeth (mating pinion tooth surfaces) onto the grinding surface of the threaded grinding wheel. When a crown gear is ground, the grinding surface of the threaded grinding wheel, which represents the tooth form of a mating pinion, forms the appropriate conjugate surface on the tooth surfaces of the crown gear.

Figure 6:
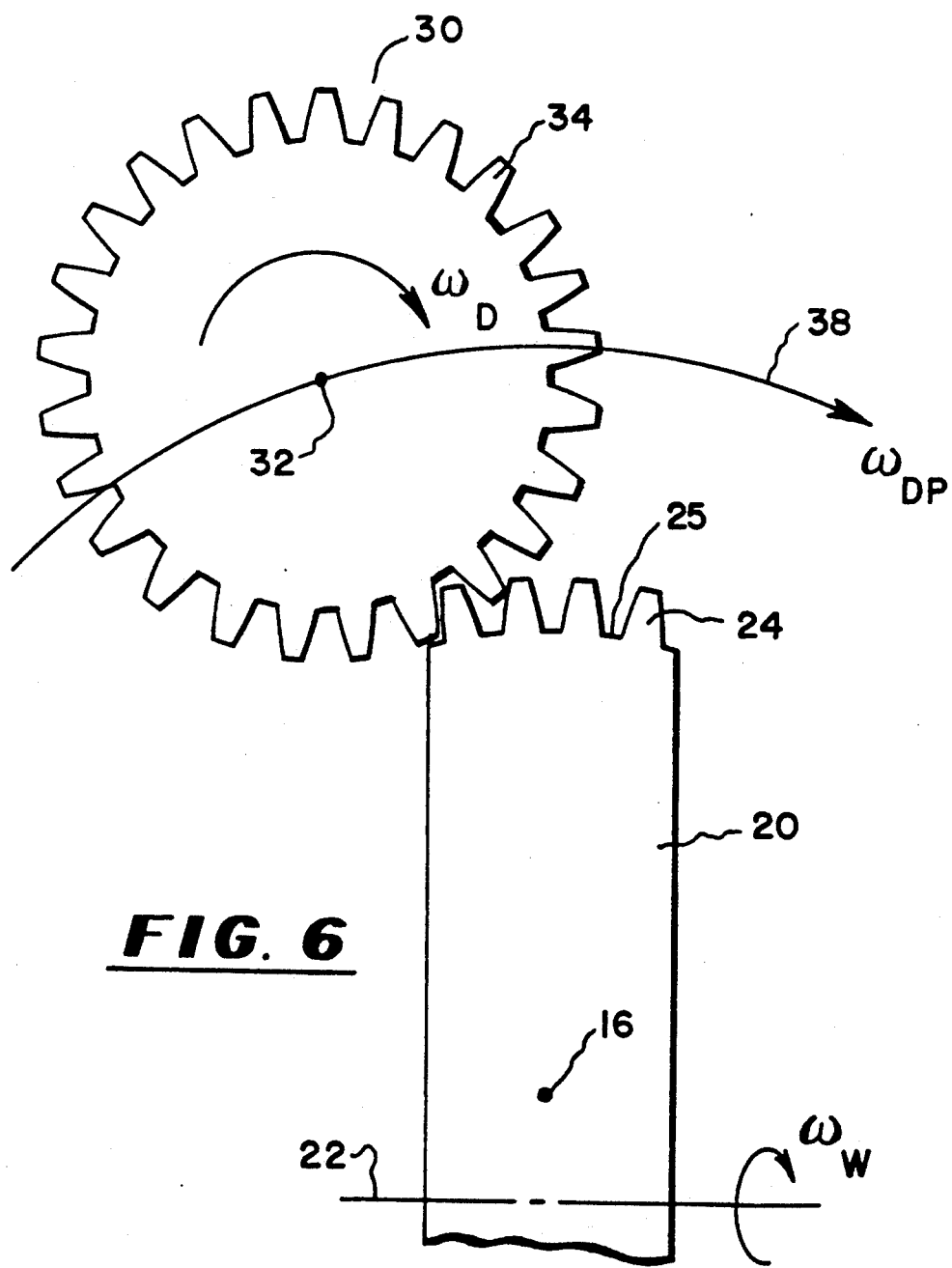
FIG. 6 illustrates the position of the dressing wheel relative to the grinding wheel at the beginning of the dressing process.

FIG. 6 shows the beginning of the inventive dressing process wherein a gear-shaped dressing tool 30 having an axis of rotation 32 and tooth surfaces 34 is rotated about its axis 32 at a velocity $\omega_D$ and at the same time is caused to move across the entire width of the grinding wheel 20 along a path 38 at an orbital velocity $\omega_{DP}$. The grinding wheel 20 is rotated at a velocity $\omega_W$ with the respective velocities of the grinding wheel 20 and dressing tool 30 being such that they are capable of running in mesh with one another. The path 38 is defined by orbiting the axis 32 of the dressing tool 30 about the point 16 on the grinding wheel 20 that corresponds to the center of the mating pinion represented in the axial section of the grinding wheel 20, such as shown in FIG. 5.

Figure 7:
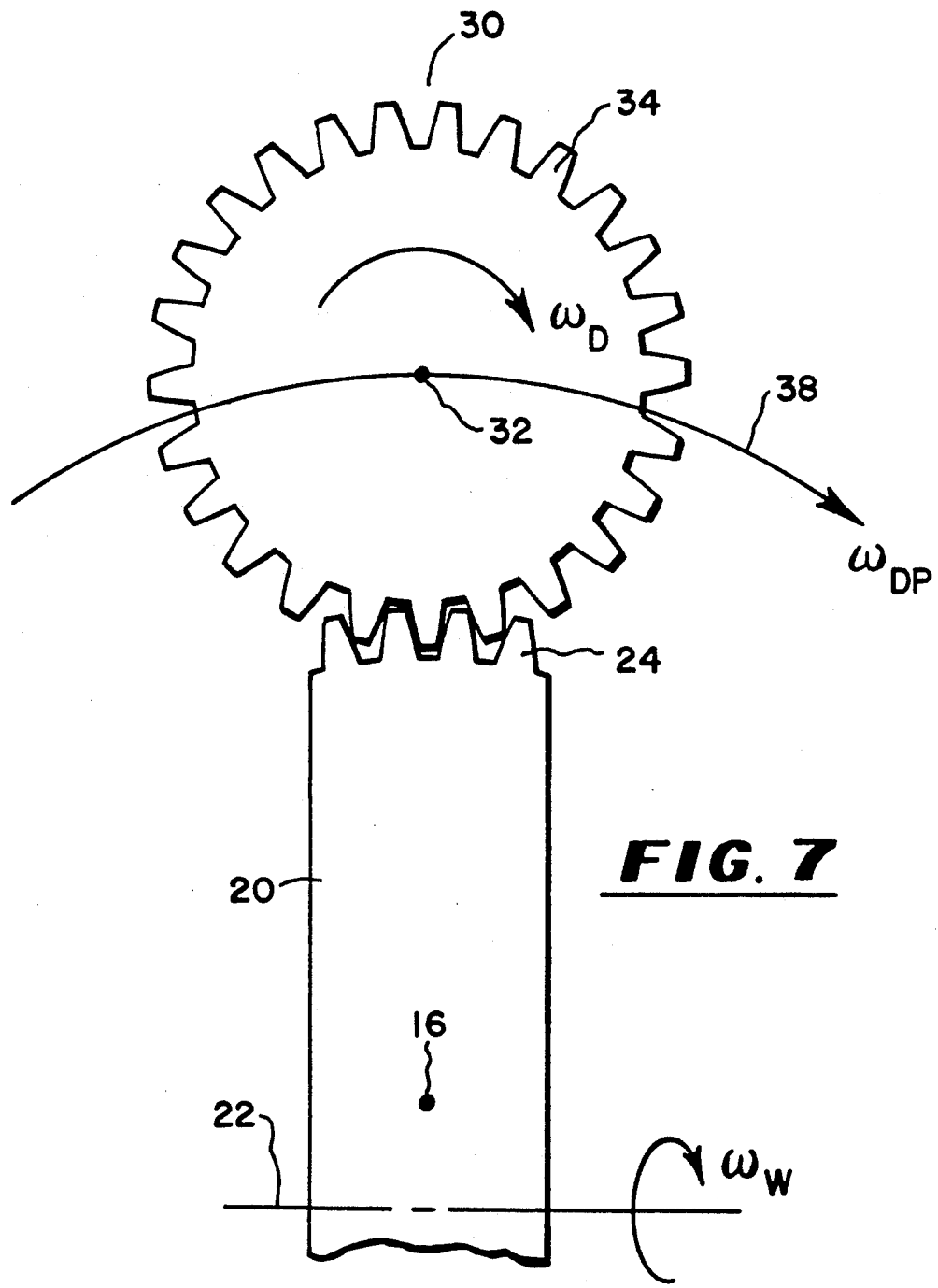
FIG. 7 illustrates the position of the dressing wheel at about the mid-point of the dressing method.
Figure 8:
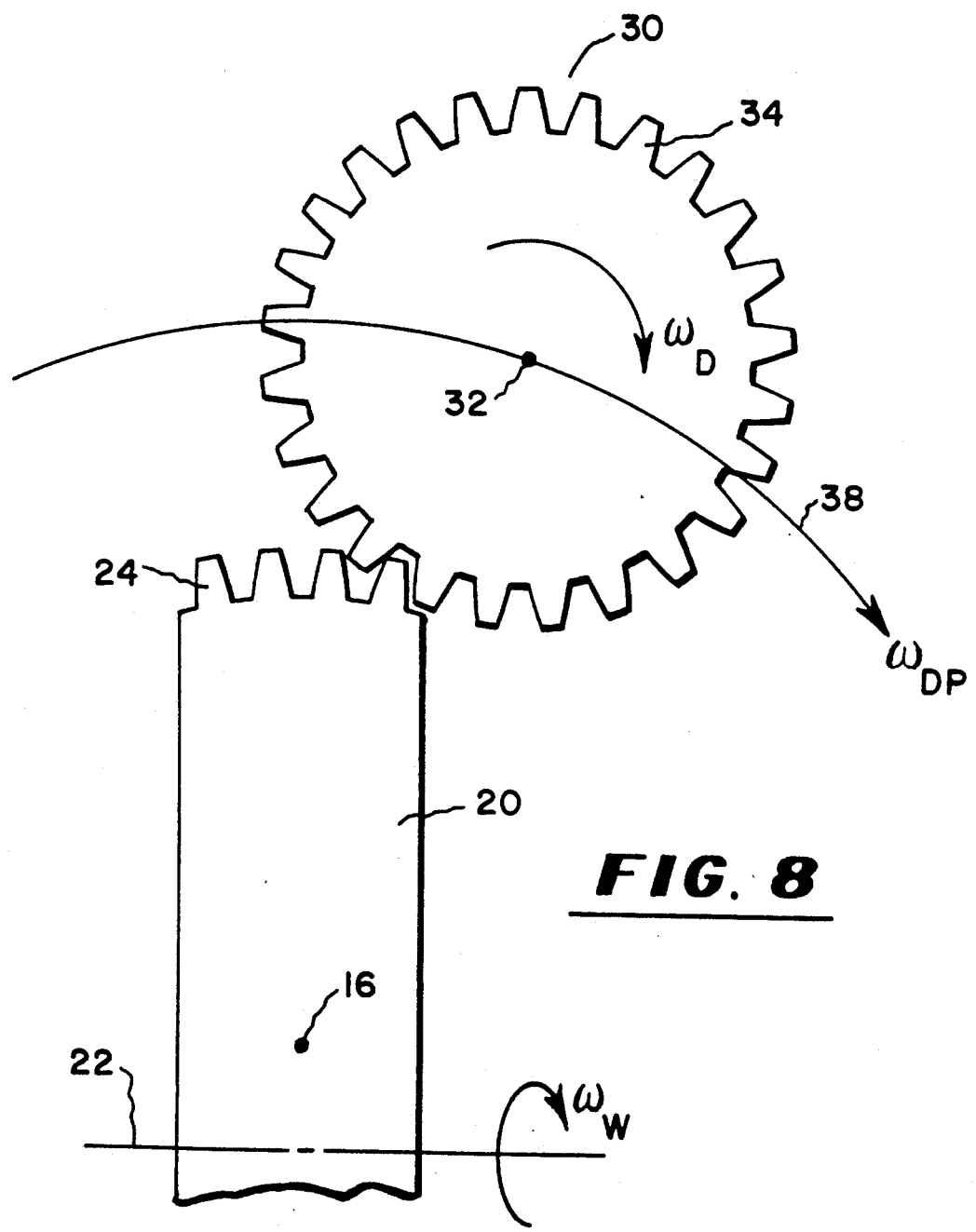
FIG. 8 illustrates the position of the dressing wheel relative to the grinding wheel near the end of the dressing method.

FIGS. 7 and 8 show, respectively, the dressing tool 30 at about midway through the dressing process and near the end of the dressing process. The dressing tool 30 follows the arcuate path 38 about point 16 from the moment of first contact at one end of the grinding wheel 20 until contact is lost at the other end of the grinding wheel. The addendum of the dressing tool is preferably lengthened so that the surface of the grinding wheel slot 25 (see FIG. 6) may also be dressed.

The orbital velocity of the dressing tool as well as the rotational velocities of the dressing tool and grinding wheel are related as follows:

$$\omega_D = \omega_W \frac{n_W}{n_D} + \omega_{DP} \frac{n_P}{n_D}$$

wherein
$\omega_D$=Dressing tool rotational velocity
$\omega_W$=Grinding wheel rotational velocity
$\omega_{DP}$=Dressing tool orbital velocity
$n_W$=Number of starts on the grinding wheel $n_D$ = Number of teeth on the dressing tool
$n_P$ = Number of teeth on the mating pinion The process may be carried out on any machine capable of orienting the dressing tool and grinding wheel in such a manner that the inventive process may be performed. A preferred machine is that disclosed in commonly assigned U.S. Pat. No. 5,175,962 to Pedersen. The machine comprises computer numerical control and is capable of rotating a grinding wheel and dressing tool and moving the dressing tool and grinding wheel relative to one another in up to three mutually perpendicular directions.

The inventive method is carried out as follows. The threaded grinding wheel and cylindrical dressing tool are rotated at respective speeds such that they may run in mesh with one another. The grinding wheel and dressing tool are brought into mesh with one another at one end of the width of the grinding wheel. Simultaneously with running in mesh with one another, the dressing tool is moved relatively across the width of the grinding wheel until contact is lost at the other end of the grinding wheel. At this point the dressing cycle is complete and grinding of the crown gears may be continued.

It is to be understood that although movement of the dressing tool along the width of the grinding wheel has been described by movement of the dressing tool, the present invention also contemplates effecting the arcuate orbital path by movement of the grinding wheel or by a combination of dressing tool and grinding wheel motions resulting in the arcuate orbital path required for dressing according to the present invention.

The present invention offers an advantage over the prior art dressing methods in that the occurrence of flat portions on the surface of the grinding wheel is eliminated. The inventive dressing process offers a much simpler dressing tool which produces very accurate results.

The profile shape of the teeth in the inventive dressing tool is essentially the same as the profile shape of the teeth of the mating pinion, for example, a circular arc or, preferably, an involute. Of course, if any mismatch is desired in the crown gear, the appropriate mismatch may be included in the dressing tool and dressed into the grinding surface of the grinding wheel.

Although the dressing tool of the present invention has been illustrated with a cylindrical dressing tool having straight teeth, it is to be understood that a dressing tool having helically extending teeth may also be used in the present dressing method.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of dressing a threaded grinding wheel for grinding crown gears, said threaded grinding wheel having an axis of rotation, a width, and including at least one thread-like grinding surface generally helically arranged in at least one revolution about said grinding wheel and extending along said width, said at least one thread-like grinding surface, when viewed in an axial section of said grinding wheel, having the tooth form of a mating pinion member to said crown gear, said method comprising:

providing a dressing tool in the form of a pinion member, said dressing tool having the same pitch as said mating pinion member, rotating said dressing tool and said grinding wheel at respective velocities whereby said dressing tool and grinding wheel may run in mesh with one another, contacting said rotating dressing tool and said rotating grinding wheel at one end of said grinding wheel width, moving said rotating dressing tool relatively across said width of said rotating grinding wheel simultaneously with said dressing tool and grinding wheel rotating in mesh, said dressing tool moving completely along said grinding wheel width, wherein said moving is along an arcuate path about a point on said grinding wheel corresponding to a center point of said mating pinion.

2. The method of claim 1 wherein said moving along said arcuate path and the rotational velocities of said grinding wheel and said dressing tool are related as follows:

$$\omega_D = \omega_W \frac{n_W}{n_D} + \omega_{DP} \frac{n_P}{n_D}$$

wherein
$\omega_D$ = Dressing tool rotational velocity
$\omega_W$ = Grinding wheel rotational velocity
$\omega_{DP}$ = Dressing tool orbital velocity
$n_W$ = Number of starts on the grinding wheel
$n_D$ = Number of teeth on the dressing tool
$n_P$ = Number of teeth on the mating pinion.

3. The method of claim 1 wherein said dressing tool has the same number of teeth as said mating pinion.

4. The method of claim 1 wherein the teeth of said dressing tool have a longer addendum than the addendum of said mating pinion.

5. The method of claim 1 wherein the teeth of said dressing tool are diamond plated.

6. The method of claim 1 wherein said dressing tool is in the form of a cylindrical pinion having straight teeth.

7. The method of claim 1 wherein said dressing tool is in the form of a cylindrical pinion having helical teeth.

8. The method of claim 1 wherein the profile shape of the teeth of said dressing tool is essentially the same as the profile shape of the teeth of said mating pinion.

9. The method of claim 8 wherein said profile shape of said teeth of said dressing tool is an involute.

10. In a method of dressing a threaded grinding wheel for grinding crown gears wherein said grinding wheel comprises an axis of rotation, a width, and includes at least one thread-like grinding surface generally helically arranged in at least one revolution about said grinding wheel and extending along said width, said thread-like grinding surface, when viewed in an axial section of said grinding wheel, having the tooth form of a mating pinion member to said crown gear;

the improvement comprising:

providing a dressing tool in the form of a pinion member, said dressing tool having the same pitch as said mating pinion member, moving said dressing tool relatively across said width of said grinding wheel simultaneously with said dressing tool and grinding wheel rotating in mesh, said dressing tool moving completely along said grinding wheel width, wherein said moving is along an arcuate path about a point on said grinding wheel corresponding to a center point of said mating pinion.

11. The method of claim 10 wherein said moving along said arcuate path and the rotational velocities of said grinding wheel and said dressing tool are related as follows:

$$\omega_D = \omega_W \frac{n_W}{n_D} + \omega_{DP} \frac{n_P}{n_D}$$

wherein
- $\omega_D$ = Dressing tool rotational velocity
- $\omega_W$ = Grinding wheel rotational velocity
- $\omega_{DP}$ = Dressing tool orbital velocity
- $n_W$ = Number of starts on the grinding wheel
- $n_D$ = Number of teeth on the dressing tool
- $n_P$ = Number of teeth on the mating pinion.

12. The method of claim 10 wherein the profile shape of the teeth of said dressing tool is essentially the same as the profile shape of the teeth of said mating pinion.

13. The method of claim 12 wherein said profile shape of said teeth of said dressing tool is an involute.

14. The method of claim 10 wherein the teeth of said dressing tool have a longer addendum than the addendum of said mating pinion.

15. The method of claim 10 wherein said dressing tool is in the form of a cylindrical pinion having straight teeth.

16. The method of claim 10 wherein said dressing tool is in the form of a cylindrical pinion having helical teeth.

17. A method of dressing a threaded grinding wheel for grinding crown gears, said threaded grinding wheel having an axis of rotation, a width, and including at least one thread-like grinding surface generally helically arranged in at least one revolution about said grinding wheel and extending along said width, said at least one thread-like grinding surface, when viewed in an axial section of said grinding wheel, having the tooth form of a mating pinion member to said crown gear, said method comprising:

providing a dressing tool in the form of a pinion member, said dressing tool having the same pitch as said mating pinion member, moving said dressing tool relatively across said width of said grinding wheel simultaneously with said dressing tool and grinding wheel rotating in mesh, said dressing tool moving completely along said grinding wheel width, wherein said moving is along an arcuate path about a point on said grinding wheel corresponding to a center point of said mating pinion, with the relative moving of the dressing tool and the rotational velocities of said grinding wheel and said dressing tool being related as follows:

$$\omega_D = \omega_W \frac{n_W}{n_D} + \omega_{DP} \frac{n_P}{n_D}$$

wherein
- $\omega_D$ = Dressing tool rotational velocity
- $\omega_W$ = Grinding wheel rotational velocity
- $\omega_{DP}$ = Dressing tool orbital velocity
- $n_W$ = Number of starts on the grinding wheel
- $n_D$ = Number of teeth on the dressing tool
- $n_P$ = Number of teeth on the mating pinion.

18. The method of claim 17 wherein the profile shape of the teeth of said dressing tool is essentially the same as the profile shape of the teeth of said mating pinion.

19. The method of claim 18 wherein said profile shape of said teeth of said dressing tool is an involute.

20. The method of claim 17 wherein the teeth of said dressing tool have a longer addendum than the addendum of said mating pinion.

* * * * *